United States Patent
Sun et al.

(10) Patent No.: US 7,409,132 B2
(45) Date of Patent: Aug. 5, 2008

(54) PLASTIC WAVEGUIDE FOR TERAHERTZ WAVE

(75) Inventors: Chi-Kuang Sun, Taipei (TW); Li-Jin Chen, Taipei (TW); Hung-Wen Chen, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 11/493,766

(22) Filed: Jul. 27, 2006

(65) Prior Publication Data

US 2008/0025680 A1 Jan. 31, 2008

(51) Int. Cl.
G02B 6/02 (2006.01)
(52) U.S. Cl. ...................................................... 385/123
(58) Field of Classification Search .................. 385/123
See application file for complete search history.

(56) References Cited

U.S. PATENT DOCUMENTS

| | | | | |
|---|---|---|---|---|
| 5,581,639 | A * | 12/1996 | Davies et al. | 385/10 |
| 5,796,884 | A * | 8/1998 | Wingo | 385/16 |
| 6,438,298 | B1 * | 8/2002 | Matsui et al. | 385/50 |
| 2005/0024716 | A1 * | 2/2005 | Nilsson et al. | 359/341.31 |
| 2005/0279354 | A1 * | 12/2005 | Deutsch et al. | 128/200.24 |
| 2006/0038168 | A1 * | 2/2006 | Estes et al. | 257/25 |

OTHER PUBLICATIONS

Han et al., Applied Physics Letters, Apr. 15, 2002, pp. 2634-2636, vol. 80, No. 15.
Jeon et al., Applied Physics Letters, Dec. 20, 2004 pp. 6092-6094, vol. 85, No. 25.
Chandler, Journal of Applied Physics, Dec. 1949, pp. 1188-1192, vol. 20.
Elasasser, Journal of Applied Physics, Dec. 1949, pp. 1193-1196, vol. 20.
Tong et al, Nature, Dec. 18/25, 2003, pp. 816-819, vol. 426.
Wang et al, Nature, Nov. 18, 2004, pp. 376-379, vol. 432.
Jeon et al., Applied Physics Letters, 2005, pp. 161904-1-161904-3, 86.
Frankel et al., IEEE Transactions on Microwave Theory and Techniques, Jun. 1991, pp. 910-916, vol. 39, No. 6.
Heiliger et al., Applied Physics Letters, Apr. 28, 1997, pp. 2233-2235, vol. 70, No. 17.
Mendis et al., Journal of Applied Physics, Oct. 1, 2000, pp. 4449-4451, vol. 88, No. 7.
Jamison et al., Applied Physics Letters, Apr. 10, 2000, pp. 1987-1989, vol. 76, No. 15.
Goto et al., Japanese Journal of Applied Physics, 2004, pp. L317-L319, vol. 43, No. 2B.

\* cited by examiner

*Primary Examiner*—Frank G Font
*Assistant Examiner*—Mary A El Shammaa
(74) *Attorney, Agent, or Firm*—Birch, Stewart, Kolasch & Birch, LLP

(57) ABSTRACT

The invention discloses a plastic waveguide for guiding terahertz (THz) wave with a wavelength ranging from 30 to 3000 µm. The plastic waveguide includes a core and a cladding layer. At least part of the core is made of a first plastic medium having a first refractive index, and the maximum length of a cross-section of the core is smaller than the wavelength of the guided terahertz wave. The cladding layer surrounds the core and has a second refractive index lower than the first refractive index. In the invention, only one wave mode is propagated in the plastic waveguide, and a first attenuation constant of the core for the guided terahertz wave is higher than a second attenuation constant of the cladding layer for the guided terahertz wave.

12 Claims, 2 Drawing Sheets

PLASTIC WAVEGUIDE FOR TERAHERTZ WAVE

BACKGROUND OF THE INVENTION

1. Field of the Invention

The invention relates to a plastic waveguide and more particularly to a plastic waveguide for guiding terahertz (THz) wave with a wavelength ranging from 30 to 3000 µm.

2. Description of the Prior Art

Strong attenuation in the terahertz (THz) gap, which occupies the wavelength ranging from 30 to 3000 µm (10 to 0.1 THz), is always a severe problem in long distance THz waveguiding. Even though many efforts on THz generation and detection techniques have been done to improve the detectable level of the THz signals, the unacceptably high dielectric loss and finite metal conductivity in this regime are still challenging optical fiber-type or metal-type waveguide design.

Hence, almost all the setups of current THz application systems are constructed with planar or curved metal reflectors, which make the system not only rigid but also vulnerable to environmental disturbance. With the perspective on a compact, reliable, and flexible THz system for applications such as molecular sensing, warfare inspections, and biomedical imaging, a low-loss THz waveguide is essential to be developed. Recently, many metal-based waveguiding techniques, including metal parallel plate and bare metal wire, were reported to have a much improved attenuation constant compared to other conventional microwave waveguides and various dielectric-based waveguides. The development of these low-attenuation metal waveguides has the potential to realize a waveguide-based THz system which usually requires a THz guiding distance longer than 1 meter. Even though the current reported results show that the metal-based guiding techniques are the best solutions that meet the need of low attenuation, we find that a simple plastic wire with a sub-wavelength diameter, similar to an optical fiber, can also provide a low guiding attenuation under the single-mode operation. The concept of such a sub-wavelength fiber has been successfully demonstrated both in the microwave and optical frequencies in 1940s and recent years, respectively.

The related prior arts refer to the following: [1] T.-I. Jeon and D. Grischkowsky, *Appl. Phys. Lett.*, vol. 85, pp. 6092-6094, 2004; [2] K. Wang and D. M. Mittleman, *Nature*, vol. 432, pp. 376-379, 2004; [3] T.-I. Jeon, J. Zhang and D. Grischkowsky, *Appl. Phys. Lett.*, vol.86, 161904, 2005; [4] M. Y. Frankel, S. Gupta, J. A. Valdmanis, and G. A. Mourou, *IEEE Trans. Microwave Theory Tech.* vol. 39, pp. 910-916, 1991; [5] J.-M. Heiliger, M. Nagel, H. G. Roskos, H. Kurz, F. Schnider, W. Heinrich, R. Hey, and K Ploog, *Appl. Phys. Lett.* vol. 70, pp. 2233-2235, 1997; [6] R. Mendis and D. Grischkowsky, *J. Appl. Phys.*, vol. 88(7), pp. 4449-4451, 2000; [7] S. P. Jamison, R. W. McGowan, and D. Grischkowsky, *Appl. Phys. Lett.* vol.76(15), pp. 1987-1989, 2000; [8] H. Han, H. Park, M. Cho, and J. Kim, *Appl. Phys. Lett.* vol. 80(15), pp. 2634-2636, 2002; [9] M. Goto, A. Quema, H. Takahashi, S. Ono, N. Sarukura, *Jpn. J. Appl. Phys.*, vol. 43(2B), L317-L319, 2004; [10] C. H. Chandler, *J. Appl. Phys.*, vol. 20, pp. 1188-1192, 1949; [11] W. M. Elsasser, *J. Appl. Phys.*, vol. 20, pp. 1193-1196, 1949; and [12] L. Tong, R R Gattass, J B Ashcom, S. He, J. Lou, M. Shen, I. Maxwell, and E. Mazur, *Nature*, vol. 426, pp. 816-819, 2003.

SUMMARY OF THE INVENTION

A scope of the invention is to provide a plastic waveguide for guiding terahertz (THz) wave with a wavelength ranging from 30 to 3000 µm, and more particularly, the plastic waveguide applied in the invention is easily available in the daily life without complex processes and expensive costs.

According to a preferred embodiment of the invention, the plastic waveguide comprises a core and a cladding layer. At least part of the core is made of a first plastic medium having a first refractive index, and the maximum length of a cross-section of the core is smaller than the wavelength of the guided terahertz wave. The cladding layer surrounds the core and has a second refractive index lower than the first refractive index of the core. In this embodiment, only one wave mode is propagated in the plastic waveguide, and a first attenuation constant of the core for the guided terahertz wave is higher than a second attenuation constant of the cladding layer for the guided terahertz wave. For example, if the cross-section of the core is circle, the propagated wave mode is $HE_{11}$ mode.

The advantage and spirit of the invention may be understood by the following recitations together with the appended drawings.

BRIEF DESCRIPTION OF THE APPENDED DRAWINGS

Figure 4:
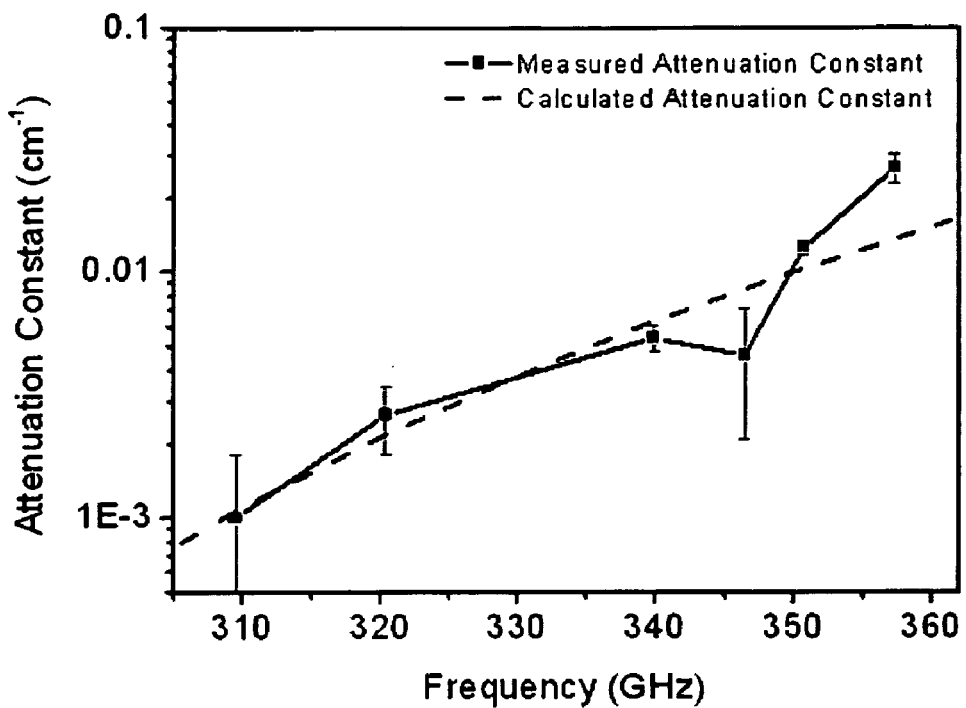

FIG. 4 shows the experimentally obtained sub-wavelength THz PE-waveguide attenuation constant $\alpha_f$ as a function of frequency between 310 GHz and 360 GHz (corresponding to the $a/\lambda_0$ ratio from 0.20 to 0.17).

Figure 5:
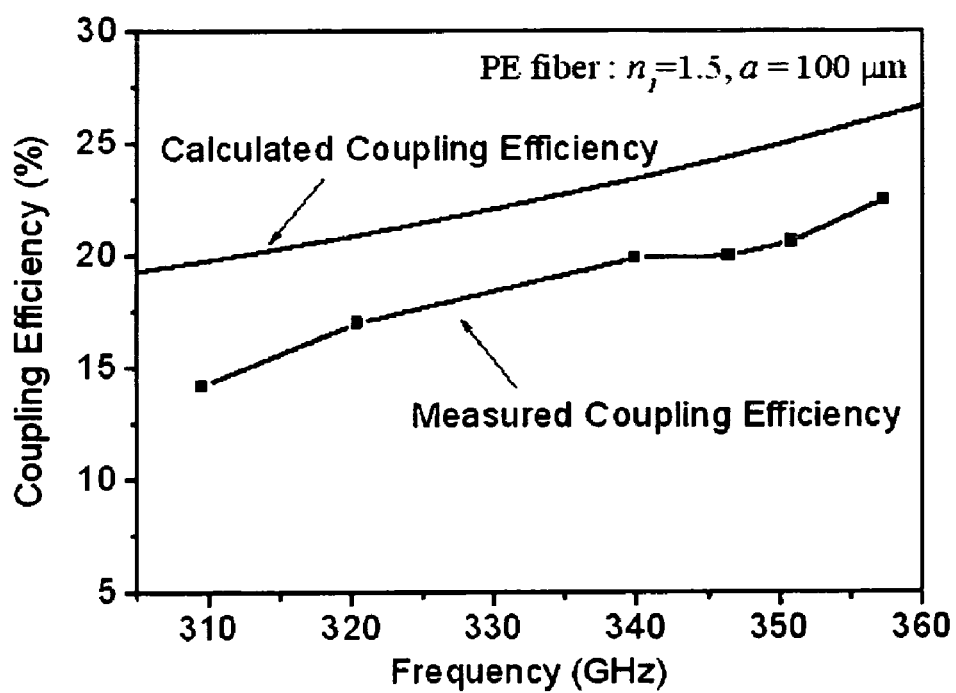

FIG. 5 shows the comparison of measured (square) and calculated (solid) coupling efficiency of the PE wire in the frequency range of 310-360 GHz.

DETAILED DESCRIPTION OF THE INVENTION

The paper related to the invention has been published in OPTICS LETTERS, Vol. 31, No. 3, Feb. 1, 2006.

Figure 1:
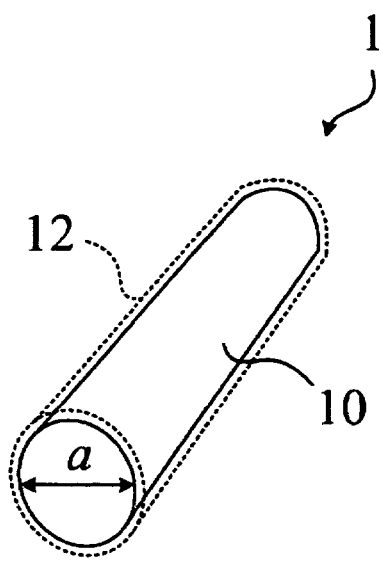
FIG. 1 illustrates a plastic waveguide according to a preferred embodiment of the invention.

Referring to FIG. 1, FIG. 1 illustrates a plastic waveguide 1 according to a preferred embodiment of the invention. The plastic waveguide 1 is used for guiding terahertz (THz) wave with a wavelength ranging from 30 to 3000 µm. As shown in FIG. 1, the plastic waveguide 1 comprises a core 10 and a cladding layer 12. In this embodiment, the core 10 is solid and made of a first plastic medium, such as polyethylene (PE) or the like, having a first refractive index, wherein the maximum length $\alpha$ of a cross-section of the core 10 is smaller than the wavelength of the guided terahertz wave. The cladding layer 12 surrounds the core 10 and has a second refractive index lower than the first refractive index. Accordingly, only one wave mode is propagated in the plastic waveguide 1, and a first attenuation constant of the core 10 for the guided terahertz wave is higher than a second attenuation constant of the cladding layer 12 for the guided terahertz wave. It should be noted that if the cross-section of the core 10 is circle as shown in FIG. 1, the propagated wave mode is $HE_{11}$ mode.

The cladding layer 12 can be a polymeric material or selected from the group consisting of air and vacuum.

In this embodiment, the maximum length α of the cross-section of the core 10 is preferably but not limited to 0.15 to 0.35 times the wavelength of the guided terahertz wave.

Figure 2:
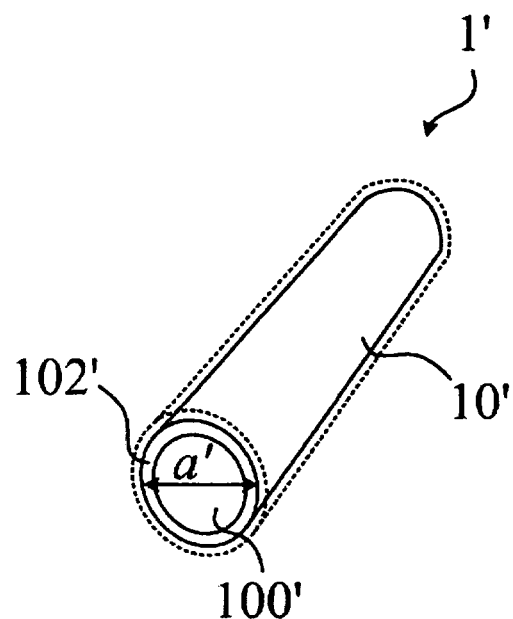
FIG. 2 illustrates a plastic waveguide according to another preferred embodiment of the invention.

Referring to FIG. 2, FIG. 2 illustrates a plastic waveguide 1' according to another preferred embodiment of the invention. The main difference between the plastic waveguide 1 shown in FIG. 1 and the plastic waveguide 1' shown in FIG. 2 is that the plastic waveguide 1' is tube-shaped. As shown in FIG. 2, the core 10' includes a central portion 100' and a peripheral portion 102' surrounding the central portion 100'. In this embodiment, the peripheral portion 102' is made of a first plastic medium, such as PE or the like, and the central portion 100' can be also made of the first plastic medium, made of a second plastic medium different from the first plastic medium, or made of an air medium or vacuum. It should be noted that the maximum length α' of the cross-section of the core 10' is preferably larger than or equal to 0.15 and smaller than 1 times the wavelength of the guided terahertz wave.

The invention discloses a low-loss sub-wavelength THz plastic waveguide as an alternative technique to the metal-based one. As will be shown from a simple theoretical calculation, the invention can reduce the fractional power inside a lossy medium and thus lower the attenuation coefficient caused by material absorption through the control of core region mode-confinement with plastic wires of different diameter-to-wavelength ratios. The large portion of fields in the air-cladding may also provide a great sensitivity in an evanescent wave based fiber sensing. To realize such a sub-wavelength THz waveguide, for example, 200 μm-diameter PE wires were adopted in the following and the attenuation constant was successfully reduced to be on the order or less than 0.01 cm$^{-1}$ in the designed frequency around 300 GHz while the measured free-space coupling coefficient of the fiber can be greater than 20% by using an off-axis parabolic mirror. With a direct coupling capability, the THz waveguide of the invention can be easily integrated with current THz systems, which can improve the system flexibility and reliability. Furthermore, all the plastic waveguides applied in the system are easily available in the daily life without complex processes and expensive costs.

Figure 3:
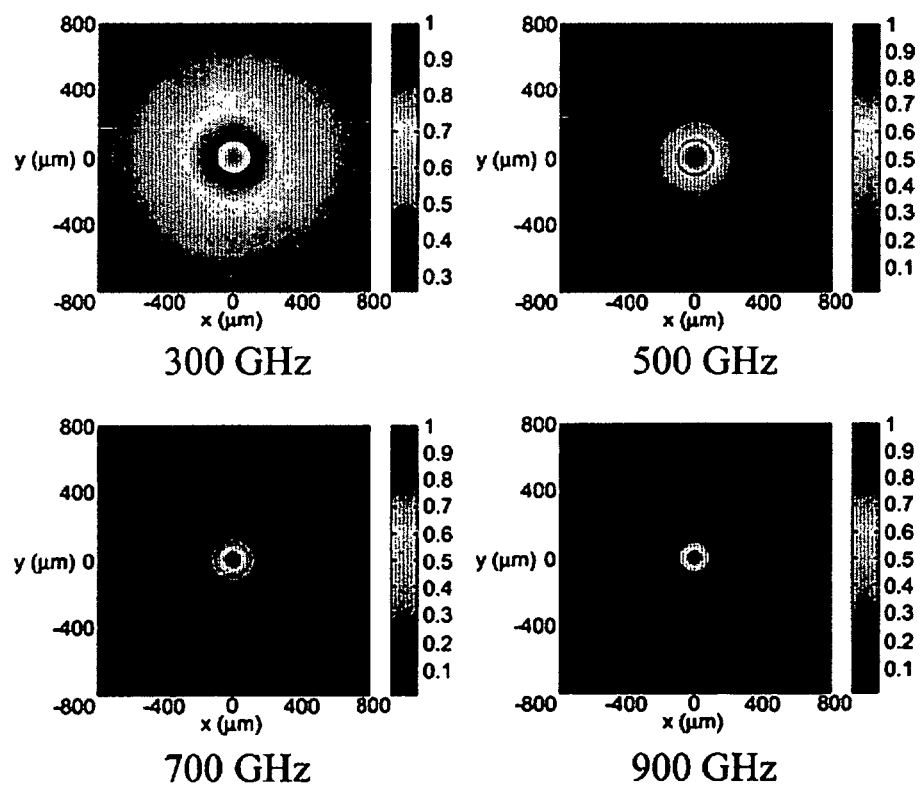
FIG. 3 shows the calculated spatial distribution of the normalized z-direction Poynting vector $S_z$ of a 200 µm-diameter PE wire for 300, 500, 700, and 900 GHz EM waves with $n_1=1.5$.

To simplify the analysis of the guiding characteristics of a sub-wavelength THz waveguide, one can assume that the plastic wire, which is with the same geometry as an air-cladding fiber, has a circular cross-section, a uniform diameter α, and a step-index profile with first refractive index $n_1$ of the core and second refractive index $n_2$ of the cladding layer. Since air serves as the cladding region, one can assume $n_2$ is equal to 1. By solving the Maxwell's equation with above parameters, one can analytically express the mode fields in the form of Bessel functions. However, due to the lack of a non-absorptive material in the THz regime, all the modes confined within the core will subject to the material absorption and make the fiber too lossy to compete with the metal-based techniques. Hence, a very straightforward thought for improving the attenuation is to reduce the fractional power inside the core by using a sub-wavelength-diameter plastic waveguide with a small diameter-to-wavelength ratio, which will also ensure the single-mode ($HE_{11}$) operation. FIG. 3 shows the calculated spatial distribution of the normalized z-direction Poynting vector $S_z$ of a 200 μm-diameter PE wire for 300, 500, 700, and 900 GHz EM waves with $n_1$=1.5. It can be observed that the power flowing outside the PE core decreases as the frequency of the guided wave increases. The fractional power η inside the core can be roughly used to estimate the effective fiber attenuation constant influenced by the core absorption. For a small η, which happens when a small diameter plastic wire is adopted, the attenuation constant will approach that of the air cladding. While for an η close to one, the attenuation constant will approximate to that of a PE bulk. To more precisely estimate the fiber attenuation caused by the material absorption, one can adopt a perturbation method.

The invention took PE wires for the sub-wavelength THz waveguides due to the fact that PE has a relatively low attenuation constant with no significant absorption lines in the THz window. Referring to FIG. 4, FIG. 4 shows the experimentally obtained sub-wavelength THz PE-waveguide attenuation constant $α_f$ as a function of frequency between 310 GHz and 360 GHz (corresponding to the $α/λ_0$ ratio from 0.20 to 0.17). Similar to the theoretical expectation, with a higher THz frequency and a larger η, the measured $α_f$ increases with frequency for a fixed-diameter PE wire. By tuning the THz frequency from 310 GHz to 360 GHz, the measured $α_f$ value has a 10-fold increase from the order of $10^{-3}$ cm$^{-1}$ to the order of $10^{-2}$ cm$^{-1}$, as expected by the theoretical calculation. It is important to notice that this is the first time for a non-metal THz waveguide an $α_{71}$ at value on the order of or lower than $10^{-2}$ cm$^{-1}$ has ever been achieved.

In the fiber optics, coupling efficiency is always an important issue. This efficiency describes the power transfer from free-space to the fiber that can be evaluated by an overlapping integral of incident field and mode field. Theoretically, 100% coupling efficiency is possible. In our experiment, we determined the coupling efficiency by first measuring the THz input power before the fiber. The coupling efficiency can then be estimated by considering the loss caused by the fiber-coupler and the attenuation of fiber. One example obtained coupling efficiency is shown in FIG. 5. Similar to theoretical prediction, with increased THz frequency, the coupling efficiency is improved under our experimental arrangement due to improved mode-field overlapping. Direct coupling efficiency as high as 20% was demonstrated.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A plastic waveguide for guiding terahertz (THz) wave with a wavelength ranging from 30 to 3000 μm, the plastic waveguide comprising:

a core, at least part of the core made of a first plastic medium having a first refractive index, the maximum length of a cross-section of the core being smaller than the wavelength of the guided terahertz wave; and a cladding layer surrounding the core and having a second refractive index lower than the first refractive index;

wherein only one wave mode is propagated in the plastic waveguide, and a first attenuation constant of the core for the guided terahertz wave is higher than a second attenuation constant of the cladding layer for the guided terahertz wave.

2. The plastic waveguide of claim 1, wherein the maximum length of the cross-section of the core is 0.15 to 0.35 times the wavelength of the guided terahertz wave.

3. The plastic waveguide of claim 1, wherein the cross-section of the core is circle, and the propagated wave mode is $HE_{11}$ mode.

4. The plastic waveguide of claim 1, wherein the core includes a central portion and a peripheral portion surrounding the central portion, and the peripheral portion is made of the first plastic medium.

5. The plastic waveguide of claim 4, wherein the central portion is made of a second plastic medium different from the first plastic medium.

6. The plastic waveguide of claim 4, wherein the central portion is made of an air medium or vacuum.

7. The plastic waveguide of claim 6, wherein the maximum length of the cross-section of the core is larger than or equal to 0.15 and smaller than 1 times the wavelength of the guided terahertz wave.

8. The plastic waveguide of claim 4, wherein the central portion is made of the first plastic medium.

9. The plastic waveguide of claim 1, a third attenuation constant of the plastic waveguide for the guided terahertz wave is between $0.001$ cm$^{-1}$ and $0.01$ cm$^{-1}$.

10. The plastic waveguide of claim 1, wherein the first plastic medium is polyethylene (PE).

11. The plastic waveguide of claim 1, wherein the cladding layer is selected from the group consisting of air and vacuum.

12. The plastic waveguide of claim 1, wherein the cladding layer is a polymeric material.

* * * * *